Sept. 14, 1954  K. RÄNTSCH  2,688,899
INTERFERENCE MICROSCOPE
Filed Nov. 15, 1950
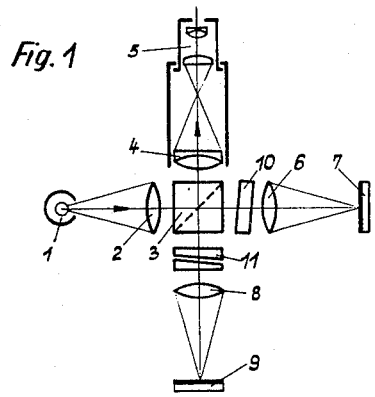
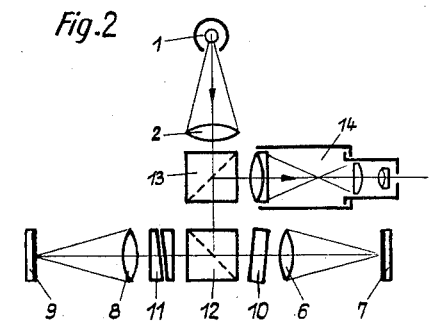
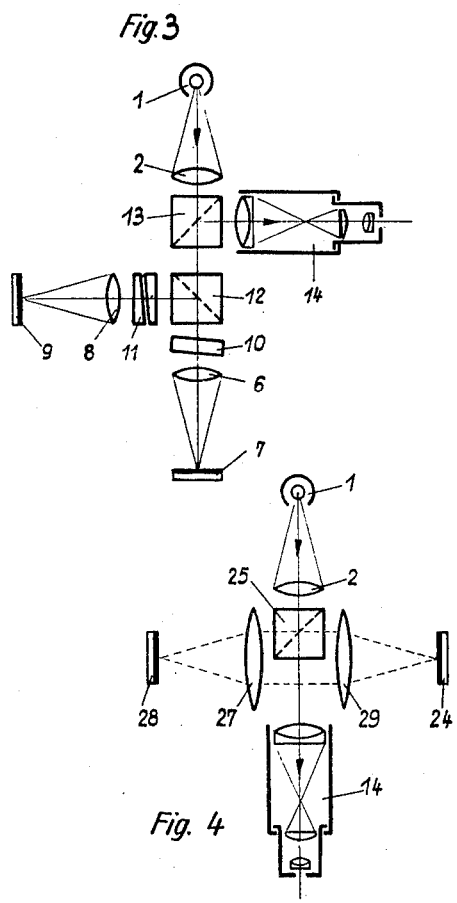
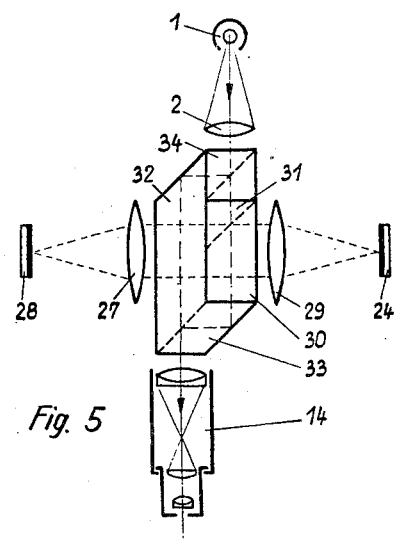

Patented Sept. 14, 1954

2,688,899

UNITED STATES PATENT OFFICE 2,688,899

INTERFERENCE MICROSCOPE

Kurt Räntsch, Heidenheim, Germany, assignor to Carl Zeiss, Heidenheim (Brenz), Germany Application November 15, 1950, Serial No. 195,778

Claims priority, application Germany November 15, 1949

7 Claims. (Cl. 88—39)

For examining the microstructure of surfaces, there exist interference microscopes in which the path of rays issuing from a source of light is split by a dividing plate between the object under examination and a comparison surface. The pencils of rays reflected from these two surfaces pass by way of the dividing plate together into the eyepiece of the microscope while interfering with each other on their course. For improving the interference images, a microscope objective is arranged between the dividing plate and each of the two surfaces to be compared, so that a magnified image of the two surfaces is generated in the focal plane of the eyepiece. These instruments work either with interferences of equal thickness or of equal inclination. Hitherto, they have been confined to working with single reflection of the pencils of rays at the surfaces under comparison.

The present invention is based on the fact that a substantially better depth resolution, in some cases down to molecular stratum thicknesses, can be obtained with the interference microscope if, instead of single reflections, multiple reflex interferences are employed. According to the invention, this is attained in an interference microscope of the above kind, with dividing plate and optical image-forming systems for the object and the comparison mirror by causing these systems to form real images of the object and the mirror upon each other. By this plan, multiple reflections result between the two surfaces, a partial pencil being split off by the dividing plate after each complete to-and-fro passage of the light beam and passed into the eyepiece. The distance between the surfaces to be compared or from the dividing plate, respectively, as well as the transmission and reflecting power of this plate, are preferably so related as to cause the successive partial rays to have an equal phase difference and their intensities to decline in geometrical progression.

Since, to obtain very sharp interference bands, there should be the highest possible number of reflections, it is moreover desirable that the intensity of the successive partial pencils diminishes by the smallest practicable steps. With certain degrees of the transmission and, hence, of the reflecting power of the dividing plate, it may happen with certain arrangements that the intensity of the first partial pencil departs from the geometrical series. In consonance with a further idea, this drawback may be avoided by the introduction of an auxiliary dividing plate by which the path of rays proceeding from the light source is divided before it attains the main dividing plate, the auxiliary path of rays so split off serving for deleting, by interference, the first partial pencil going through the main dividing plate.

In the interference microscope according to the invention, interferences of equal inclination are preferably used. To this end, a tiltable plane-parallel plate is introduced into the path of rays of the object or of the comparison mirror between the dividing plate and the corresponding objective, so that the rays are laterally offset. Another way to obtain the same result without the use of a plane plate is to offset one objective laterally of the other. If interferences of equal thickness are to be employed, as may be desirable in some cases, the object or the comparison mirror are inclined around an axis lying in their surfaces, instead of offsetting the rays by means of the plane-parallel plate.

For explaining the invention in more detail, different examples of interference microscopes are schematically represented in Figs. 1 to 5. These examples, moreover, show some additional characteristics of the invention.

In the interference microscope of Fig. 1, the rays issuing from monochromatic light source 1 are made parallel by objective 2 and then impinge upon prism 3, which has a partially reflecting surface, so that the rays are divided into two coherent portions. One of these portions is directly reflected into a telescope consisting of objective 4 and eyepiece 5, while the other portion passes through objective 6 on to comparison mirror 7, and thence by way of dividing prism 3 and objective 8 to object 9. From the object, the rays are again reflected, and again divided in prism 3. One of these parts directly enters observation telescope 4, 5, while the other is again projected on reflecting surface 7. Between this surface 7 and object 9, multiple reflection of the rays therefore takes place, in which a partial ray pencil is split off in prism 3 after each passage.

The two objectives 6 and 8 should preferably though not necessarily be of the same kind and design. For the rest, they are so designed and arranged as to form overlying images of the surfaces 7 and 9. Preferably, these two surfaces should lie in the focal planes of their corresponding objectives, so that the dividing prism will be in the parallel path of rays, and both objectives should be corrected for infinity. Arranged between prism 3 and objective 6 is a tiltable plane plate 10 for generating interferences of equal inclination. By tilting this plate, the interfering ray pencils are offset laterally of each other. For setting the difference of the path of light between the successive partial pencils to a definite wave length fraction, an adjusting wedge 11 is provided in the path of the object rays.

In regard to the intensity of consecutive partial ray pencils of equal phase difference, let it be assumed for the sake of simplicity that the reflection at object surface 9 and comparison mirror 7 be approximately 1, so that practically no loss of reflection exists. The intensity of the various partial rays is then only a matter of the reflecting power R and the transmission T of prism 3. The intensities then diminish in the progression shown below, in which the first member is the intensity of the ray which enters the observation telescope directly from light source 1 by way of plate 9:

$$R, RT^2, R^3T^2, R^5T^2, \ldots$$

This series will be geometrical only when the reflection and the transmission of prism 3 are equal, or in other words, when the beams are divided 50 to 50 per cent without loss. Otherwise the interferences will be disturbed.

Fig. 2 shows another form of the invention, in which it is possible to work also with other transmissions and reflecting powers than fifty per cent. The object 9 and comparison mirror 7 are again projected upon each other by way of objectives 6 and 8. As before, the dividing system consists of a glass cube 12 with a partially reflecting diagonal surface. Arranged between cube 12 and objective 2 of the light source is a second dividing cube 13, by way of which the interfering ray pencils are conducted into observation telescope 14. The intensities of the partial ray pencils then diminish according to the following geometric series:

$$R^2, R^2T^2, R^2T^4, \ldots$$

The quotient of this series therefore is $T^2$. As in Fig. 1, here and also as in the following forms of the invention, the losses of reflection at the object and at the comparison mirror are neglected for the sake of simplicity. The reflection and transmission at cube 13 however, need not be considered at all, seeing that they do not contribute to the interference. In the arrangement of Fig. 2, the ratio of R to T of the dividing cube may be so proportioned as to cause as small as possible a decrease in intensity from partial ray to partial ray.

The interference microscope according to Fig. 3 resembles in all important points the design of Fig. 2, with the exception that dividing prism 12 is so arranged as to cause the path of rays between object 9 and mirror 7 to be reflected at prism 12. Accordingly, the intensities of the partial ray pencils are governed by a diminution quotient depending upon the reflecting power, i. e. $R^2$. This gives the following geometrical series:

$$T^2, T^2R^2, T^2R^4, \ldots$$

Figs. 4 and 5 show two further especially good forms of the invention, in which likewise the decline in the intensity of successive partial rays is especially low, so that sharp multiple-reflection interferences are produced. In Fig. 4, the light issuing from source 1 falls on dividing cube 25, whence one portion directly reaches observation telescope 14, while the other falls upon object 28 through objective 27. The dividing cube 25 is so dimensioned as to take up only half the aperture of objectives 27 and 29. The ray reflected from object 28 therefore reaches the comparison mirror 24 without again passing through cube 25. There it is reflected and one portion enters telescope 14 by way of cube 25. The other portion returns to object 28, between which and mirror 24 it is repeatedly reflected and a partial ray pencil split off each time at prism 25. Since the rays between the object and the comparison mirror therefore pass through the dividing cube only one way, the partial ray intensities decline only with the linear quotient T of the geometrical series. The series is:

$$T, R^2, TR^2, T^2R^2, T^3R^2, \ldots$$

Here too, the first member fits into the geometrical progression only provided that the reflection and transmission of cube 25 are equal, as for instance when each amounts to 50 per cent. In order to be able to use also other values, it is of advantage to extinguish the first partial ray by interference. This is accomplished with the arrangement of Fig. 5, which otherwise is like that of Fig. 4. In front of the main dividing prism 30 with its partially reflecting surface 31 between objectives 27 and 29 a further dividing prism 34 is provided. The ray coming from light source 1 is divided here, and the auxiliary ray pencil so split off is reflected into prism 32, while the partial ray passing through the dividing surface falls upon the surface 31 of main dividing prism 30, whence it is repeatedly reflected between object 28 and comparison mirror 24. The first ray, which passes straight through the dividing cube 30 and is of the intensity T, enters prism 33, and, after being reflected there interferes with the auxiliary ray passing through prism 32. The difference in path and the intensity of this ray are so proportioned that the two rays just extinguish each other. For the intensity of the remaining successive partial ray pencils, the same geometrical series obtains as in the instrument of Fig. 4, with the exception that the first member is missing.

The interference arrangements of Figs. 4 and 5 likewise admit of working with interferences of equal inclination or equal thickness. In the former case, it is best to insert into the parallel path of rays between the dividing prism and the object or the comparison mirror, a tiltable plane-parallel plate, while in the second case, the object or the comparison mirror itself is tilted.

I claim:

1. An interference microscope arrangement for observation and examination of structural details of a test object surface having reflective properties including a monochromatic light source, a comparison mirror surface and a microscope system having an objective and an eyepiece, and an optical beam splitting means disposed between said source and said surfaces to reflect part of a beam of light and to transmit another part of light from said source, said beam splitting means at least including one partially transmitting and partially reflecting layer, further optical means at least including two optical lens systems each one disposed between one of said surfaces and said layer with their optical axes coincident and with each said surface located in the focal plane of the respective belonging optical lens system such as to form sharp real images of each of the said surfaces upon one another thus effecting multiple reflexions of the beam reflected to-and-fro between said surfaces under striking the said layer, said microscope system disposed for receiving and combining the partial beams split off from the multiply reflected beams after each to-and-fro passage in the ocular image plane for viewing the resulting interference fringes.

2. In an interference microscope arrangement according to claim 1 said further optical means comprising additionally an optically planoparallel plate and a pair of optical wedges, said plate disposed in the parallel path of the light beam of one said surface and said layer, said wedges disposed in the parallel path of the light beam of the other said surface and said layer, and means for adjusting the angle included between said plate and the optical axis of said light beam, and means for adjusting the mutual relative position of said wedges.

3. In an interference microscope arrangement according to claim 1 said optical beam splitting means including a second light partially reflecting and partially transmitting layer interposed between said light source and the first said partially reflecting and partially transmitting layer, said second layer disposed for directing part of the light from said source to said first layer and for directing part of the said multiply reflected beams after each to-and-fro passage between said surfaces to said microscope system.

4. In an interference microscope arrangement according to claim 1 said surfaces being located on one and the same side of said layer, said source and said microscope system being located on the other side of said layer.

5. In an interference microscope arrangement according to claim 1 said surfaces being located on different sides of said layer.

6. In an interference microscope arrangement according to claim 1 said optical beam splitting means including a second light partially reflecting and partially transmitting layer interposed between said light source and the first said partially reflecting and partially transmitting layer, said second layer disposed for directing part of the light from said source to said first layer and for directing part of the said multiply reflected beams after each to-and-fro passage between said surfaces to said microscope system, said source being located on the one side of said second layer, and said first layer with said test and comparison mirror surfaces and said microscope system being located on the other side of said second layer.

7. In an interference microscope arrangement according to claim 1 said surfaces being located on different sides of said layer, said layer being located between said optical lens systems and covering only about one half the aperture size of each said lens systems on the one half side beyond the optical axis of said systems.

References Cited in the file of this patent

UNITED STATES PATENTS

| Number | Name | Date |
|---|---|---|
| 1,455,795 | Logan | May 22, 1923 |
| 1,565,533 | Twyman et al. | Dec. 15, 1925 |
| 2,151,631 | Williams | Mar. 21, 1939 |

FOREIGN PATENTS

| Number | Country | Date |
|---|---|---|
| 901,685 | France | Nov. 13, 1944 |